US006606287B2

(12) United States Patent
Korfin et al.

(10) Patent No.: US 6,606,287 B2
(45) Date of Patent: Aug. 12, 2003

(54) METHOD AND APPARATUS FOR COMPRESSION RATE SELECTION

(75) Inventors: Rick Korfin, San Diego, CA (US); Mike Sandler, San Diego, CA (US)

(73) Assignee: Vengo, Inc., San Diego, CA (US)

( * ) Notice: Subject to any disclaimer, the term of this patent is extended or adjusted under 35 U.S.C. 154(b) by 58 days.

(21) Appl. No.: 09/725,369

(22) Filed: Nov. 29, 2000

(65) Prior Publication Data

US 2002/0064118 A1 May 30, 2002

(51) Int. Cl.[7] .................................................. G11B 5/09
(52) U.S. Cl. ................................ 369/47.28; 369/124.06
(58) Field of Search ........................... 369/47.15, 47.17, 369/47.28, 47.35, 53.12, 53.31, 53.32, 53.33, 53.36, 53.44, 59.13, 124.06, 47.21

(56) References Cited

U.S. PATENT DOCUMENTS 6,243,139 B1 * 6/2001 Takahashi et al. ......... 348/420.1
6,310,848 B1 * 10/2001 Ueki ........................ 369/53.37
6,339,568 B1 * 1/2002 Kamatani ................. 369/47.15

* cited by examiner

Primary Examiner—Paul W. Huber
(74) Attorney, Agent, or Firm—J. D. Harriman II, Esq.; Coudert Brothers LLP (57) ABSTRACT

The present invention provides a method and apparatus for compression rate selection. One embodiment of the present invention automatically selects a compression rate for a media signal. The embodiment determines an optimal compression rate for a media signal, compresses the signal at that rate, and stores the signal for later playback. An optimal compression rate is one which stores the media signal in the least amount of storage space without unacceptably degrading the media signal. One embodiment uses information about the media signal to determine a compression rate. In one embodiment, the information is automatically generated. One embodiment automatically generates the information using meta-information (e.g., channel, genre, etc.). Another embodiment automatically generates information using natural language parsing of a media signal description. In another embodiment, the information is generated through manual entry. In yet another embodiment, the information is generated by automatically compressing a media signal at a first rate and examining the compressed signal to determine how the compression rate should be modified. In one embodiment, the information is generated at the server side of a client/server architecture. In another embodiment, the information is generated at the client side of a client/server architecture. In yet another embodiment, the information is generated at both sides of a client/server architecture.

10 Claims, 10 Drawing Sheets

Figure 1: Recording Media Signals

Figure 2: Compression Rate Selection

Figure 3: Compression Rate Selection

Figure 4: Compression Rate Selection

Figure 5: Compression Rate Selection

Figure 6: Compression Rate Selection

Figure 7: Compression Rate Selection

Figure 8: Recording Media Signal

Figure 9: Recording Media Signal

FIGURE 10

METHOD AND APPARATUS FOR COMPRESSION RATE SELECTION

BACKGROUND OF THE INVENTION

1. Field of the Invention

The present invention relates to field of home electronic entertainment and more particularly it relates to systems for compression rate selection.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Entertainment systems have advanced rapidly in recent years. First was the advent of the radio. Then, the television became popular. Next, playback devices such as the VCR came into use and more recently digital video disc (DVD) players and recorders have become popular. At the same time, the Internet has grown by leaps and bounds becoming a favorite medium for users to not only be entertained, but also shop, learn, and communicate with others via e-mail or other methods, such as newsgroups and chat-rooms.

Each of these forms of entertainment has a different appeal to its users and many users prefer to use all of these modes of entertainment from time to time. Each of these forms of entertainment, however, has its own hardware associated with it. For instance, television is watched on a television set, music is listened to on a radio, the Internet is used with a computer and associated software. DVD players implement DVD playback, etc. The plurality of devices needed to effectuate all of these modes of entertainment quickly becomes unwieldy and space inefficient when a user has all of these devices in a small space, such as the bedroom of their house.

Compounding this problem is the fact that a plurality of users in a household each desire to enjoy one or more of these modes of entertainment simultaneously and in disparate locations. Thus, in a conventional household, each room may have a TV, radio, DVD player, and personal computer for accessing the Internet. This becomes extremely space inefficient, repetitious, and wasteful. For instance, the same set of speakers could power the radio, TV, and computer, yet currently each piece of hardware has its own sound system. In addition, the same device could be used to provide output from many of these devices. For instance, the same screen could be used to display a television program and the HTML output of an Internet server on a user's web browser, yet current schemes usually employ two separate devices which leads to two screens in the same room.

One solution is found in the newly emerging "set-top" boxes. One type of set-top box combines Internet functionality with a television set, yet video playback must be used with another device making it disadvantageous. One type of set-top box provides an architecture that provides for multiple nodes, yet each node may not independently access the Internet or even watch different television stations. Other set top boxes provide a combination of Internet and television, while playback and recording devices like DVDs and DVRs must be used with separate hardware.

Recording Media

Media is frequently recorded for display at some future time. For example, a user may record a television program on a VCR. Additionally, a user may record an audio only broadcast on a tape cassette. Devices typically used for storing media include VCR tapes, DVDs, CDs, cassette tapes and computer disks.

Figure 1:
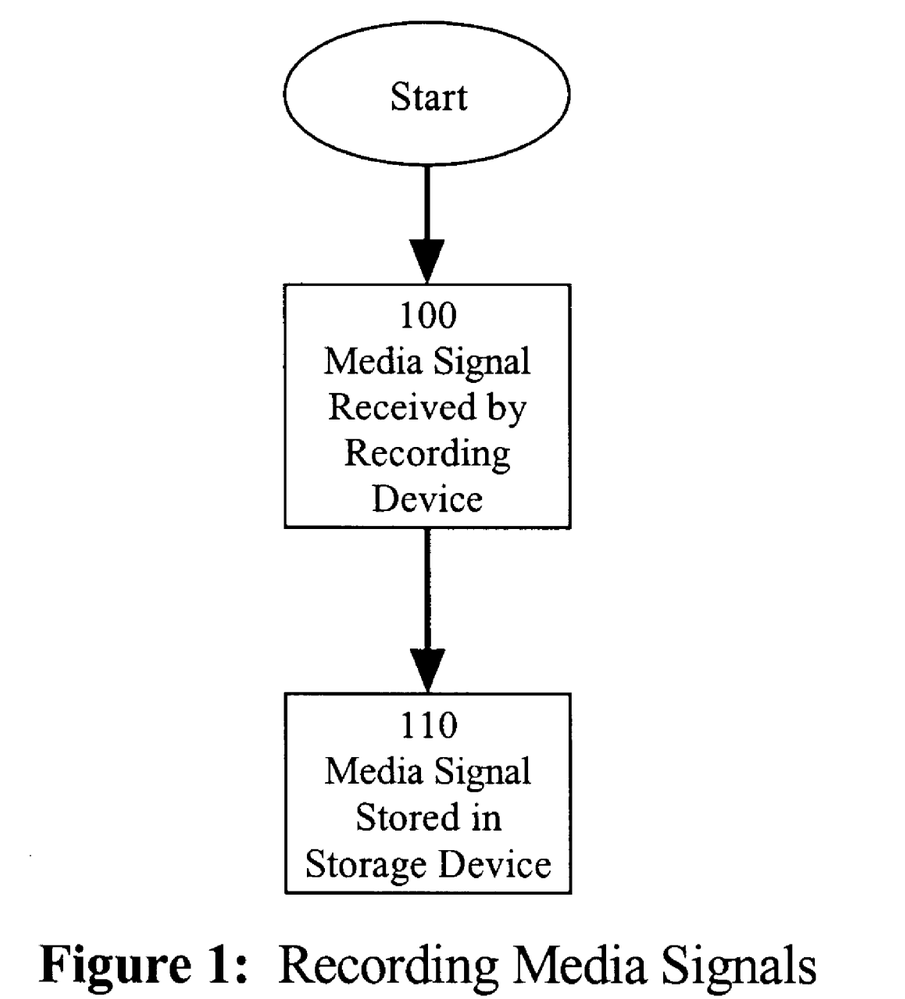
FIG. 1 is a flow diagram of the process of recording media.

FIG. 1 illustrates the process of recording media. At step 100, the media signal is received by a recording device. At step 110, the media signal is stored in a storage device.

Compression Rate

Media signals are frequently compressed. One method of compression used by VCRs is to select a recording rate. For example, the recording rate can be set such that a VCR tape records two, four or six hours of media signals. An increased compression rate allows recording more media signals in the same amount of storage space. However, an increased compression rate frequently results in lower recording quality. Thus, the process of determining a compression rate must take both storage space and signal quality into consideration.

Figure 2:
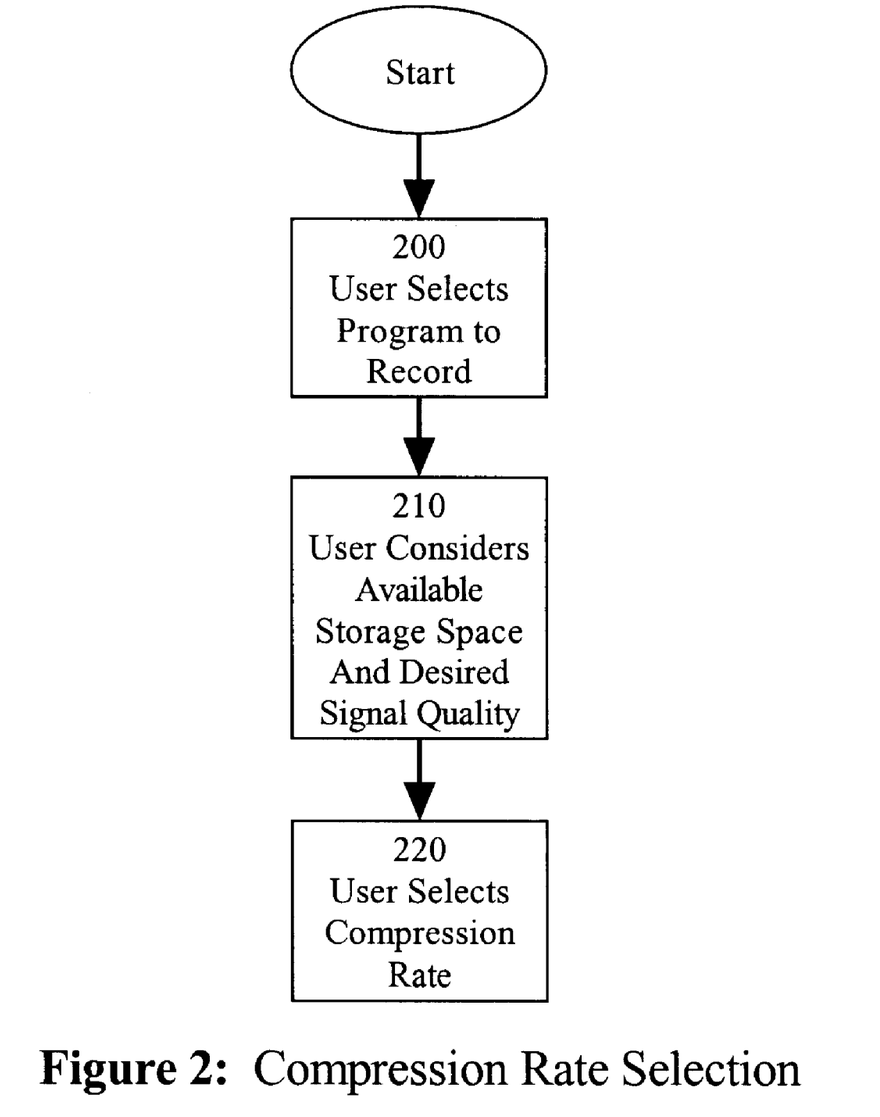
FIG. 2 is a flow diagram of a prior art method of selecting a compression rate.

FIG. 2 illustrates a prior art method of selecting a compression rate. At step 200, a user selects a program to record. At step 210, the user considers available storage space and desired signal quality. At step 220, the user selects a compression rate.

Limitations of Prior Art

Prior art solutions require a user to select a compression rate before the media signal is recorded. However, the maximum compression rate achievable without unacceptable loss of media signal quality, termed the "optimal compression rate," varies. Thus, users frequently select sub-optimal compression rates. If a user selects a lower compression rate than the optimal compression rate, more storage space is used to store the media signal than is required. Additionally, if a user selects a higher compression rate than the optimal compression rate, the signal quality of the stored media signal is unacceptable.

SUMMARY OF THE INVENTION

The present invention provides a method and apparatus for compression rate selection. One embodiment of the present invention automatically selects a compression rate for a media signal. The embodiment determines an optimal compression rate for a media signal, compresses the signal at that rate, and stores the signal for later playback. An optimal compression rate is one which stores the media signal in the least amount of storage space without unacceptably degrading the media signal.

One embodiment uses information about the media signal to determine a compression rate. In one embodiment, the information is automatically generated. One embodiment automatically generates the information using meta-information (e.g., channel, genre, etc.). Another embodiment automatically generates information using natural language parsing of a media signal description. In another embodiment, the information is generated through manual entry. In yet another embodiment, the information is generated by automatically compressing a media signal at a first rate and examining the compressed signal to determine how the compression rate should be modified.

In one embodiment, the information is generated at the server side of a client/server architecture. In another embodiment, the information is generated at the client side of a client/server architecture. In yet another embodiment, the information is generated at both sides of a client/server architecture.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for compression rate selection. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Compression Rate Selection

One embodiment of the present invention automatically selects a compression rate for a media signal. The embodiment determines an optimal compression rate for a media signal, compresses the signal at that rate, and stores the signal for later playback. An optimal compression rate is one which stores the media signal in the least amount of storage space without unacceptably degrading the media signal.

Figure 3:
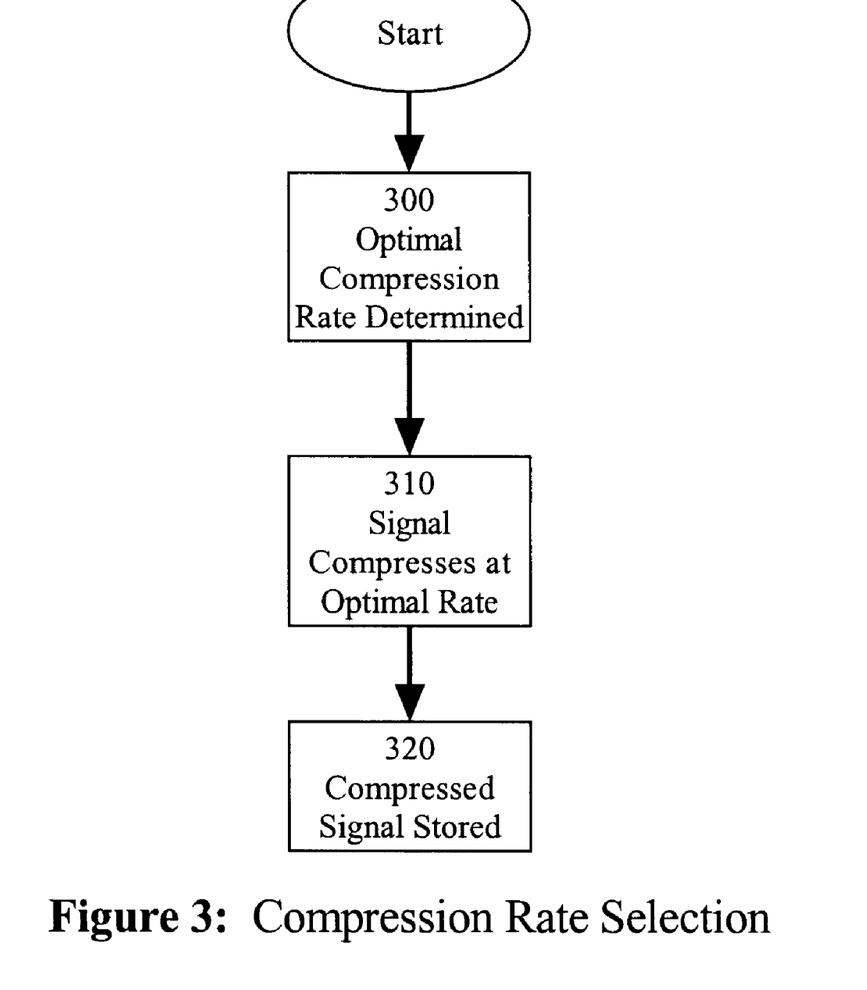
FIG. 3 is a flow diagram of the process of compression rate selection in accordance with one embodiment of the present invention.

FIG. 3 illustrates the process of compression rate selection in accordance with one embodiment of the present invention. At step 300, an optimal compression rate for a media signal is determined. At step 310, the signal is compressed at the optimal rate. At step 320, the compressed signal is stored for later playback.

One embodiment uses information about the media signal to determine a compression rate. In one embodiment, the information is automatically generated. One embodiment automatically generates the information using meta-information (e.g., channel, genre, etc.).

Figure 4:
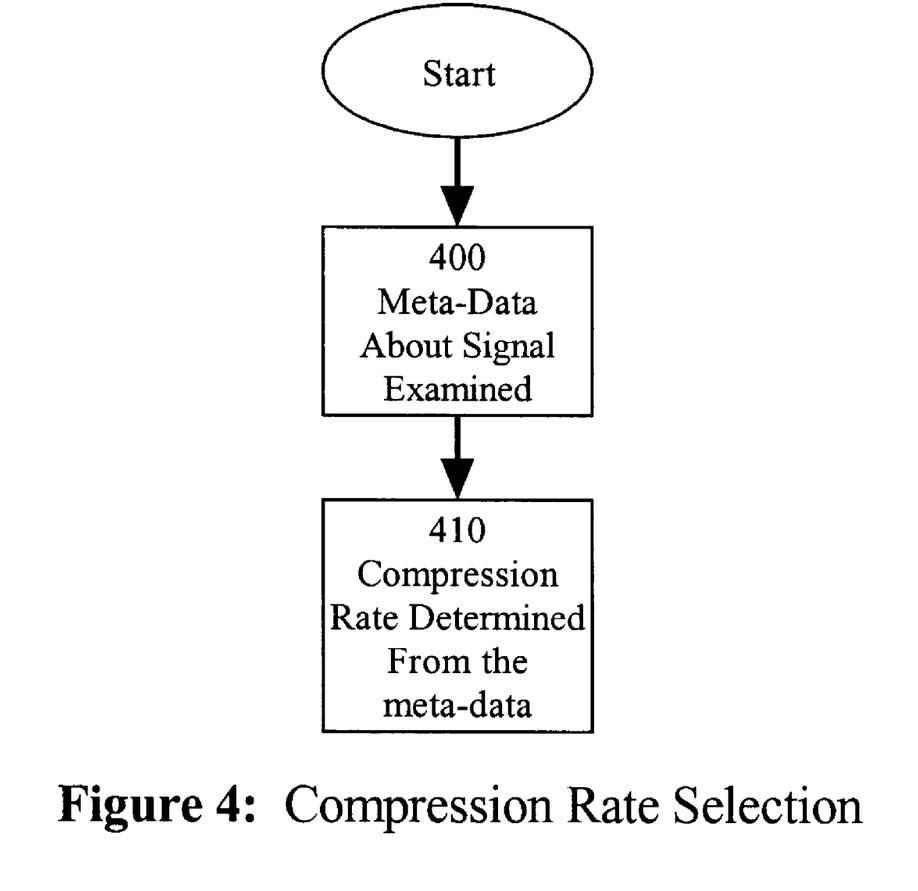
FIG. 4 is a flow diagram of the process of compression rate selection in accordance with one embodiment of the present invention.

FIG. 4 illustrates the process of compression rate selection in accordance with one embodiment of the present invention. At step 400, meta-data about the signal from a program guide is examined. At step 410, a compression rate is determined from the meta-data. For example, a black and white movie or a cartoon receives a higher compression rate because less data is required to represent either without unacceptable loss of quality. Likewise, sports programs receive a lower compression rate because more data is required to represent a sports program without unacceptable loss of quality.

Figure 5:
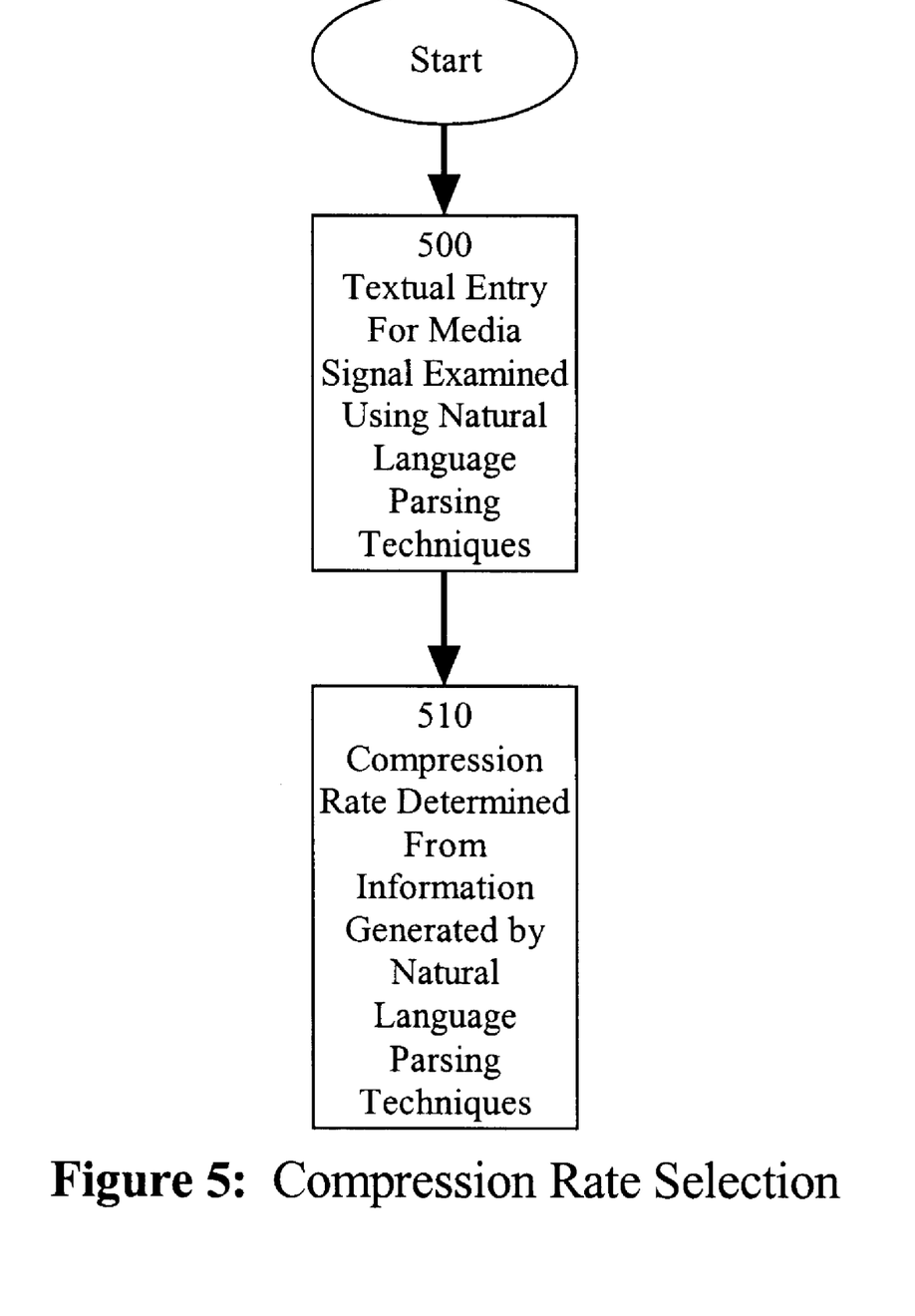
FIG. 5 is a flow diagram of the process of compression rate selection in accordance with one embodiment of the present invention.

Another embodiment automatically generates information using natural language parsing of a media signal description. FIG. 5 illustrates the process of compression rate selection in accordance with one embodiment of the present invention. At step 500, a textual entry for a media signal in a program guide is examined using natural language parsing techniques. At step 510, a compression rate is determined for the media signal from the information generated by the natural language parsing techniques. For example, if the program guide contains the word "cartoon," the compression rate is set high.

Figure 6:
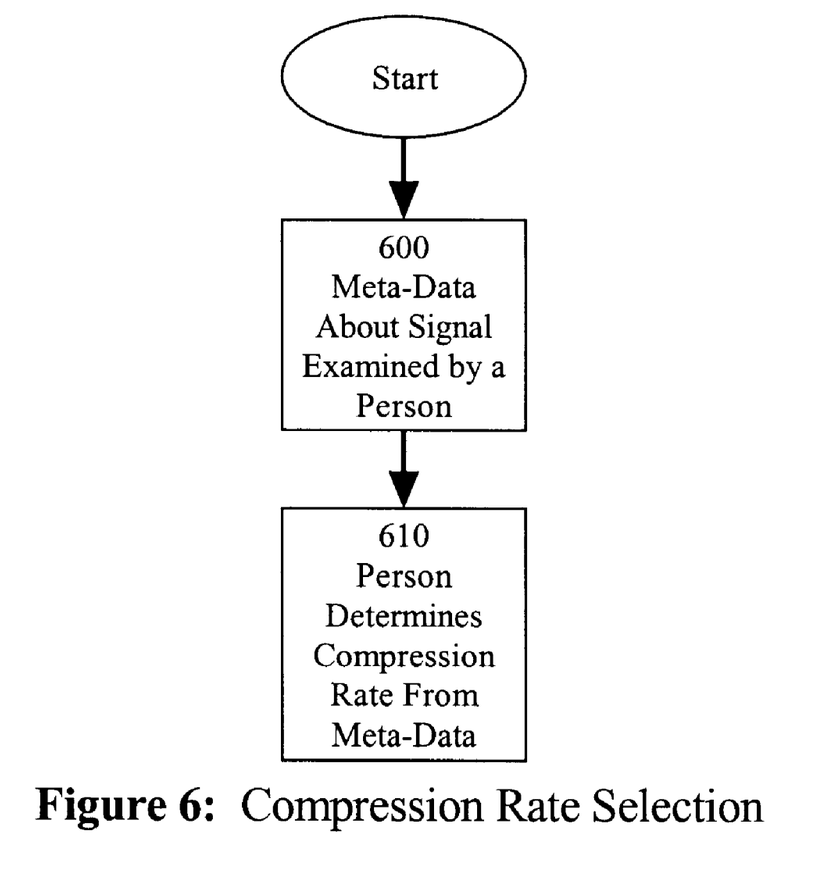
FIG. 6 is a flow diagram of the process of compression rate selection in accordance with one embodiment of the present invention.

In another embodiment, the information is generated through manual entry. FIG. 6 illustrates the process of compression rate selection in accordance with one embodiment of the present invention. At step 600, meta-data about the signal from a program guide is examined by a person. At step 610, the person determines a compression rate from the meta-data.

Figure 7:
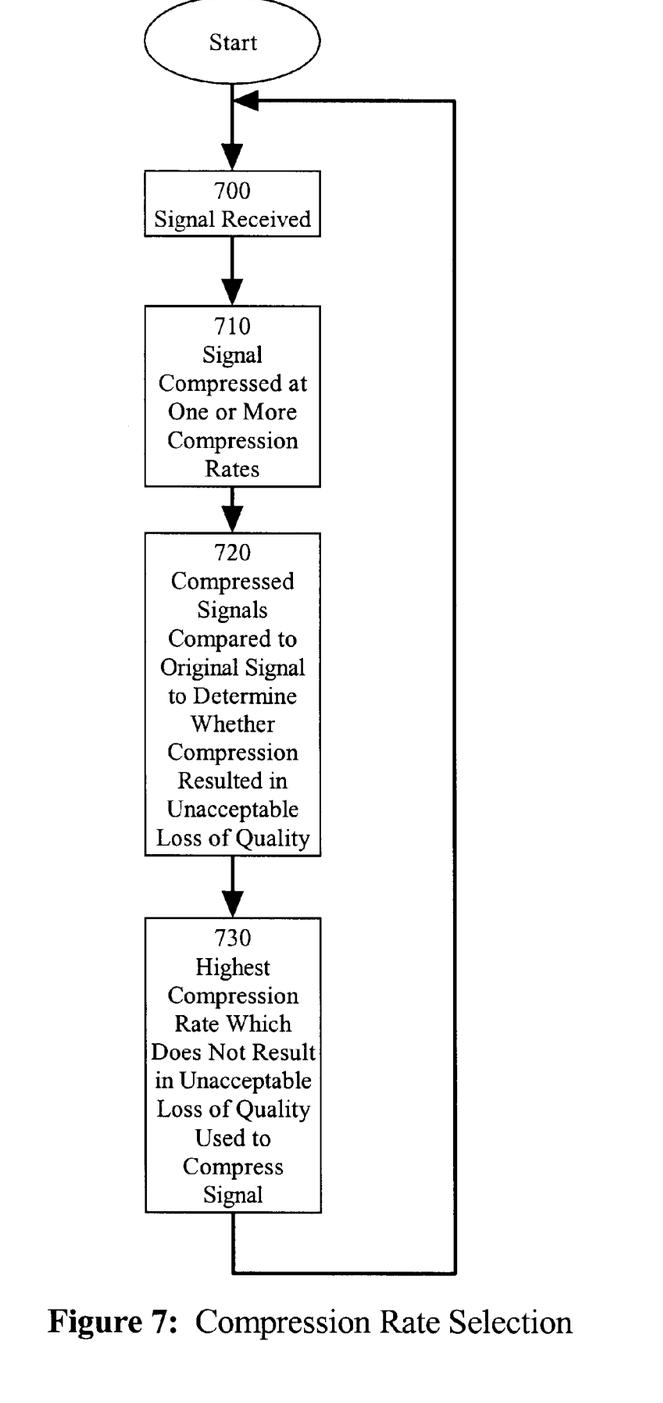
FIG. 7 is a flow diagram of the process of compression rate selection in accordance with one embodiment of the present invention.

In yet another embodiment, the information is generated by automatically compressing a media signal at a first rate and examining the compressed signal to determine how the compression rate should be modified. FIG. 7 illustrates the process of compression rate selection in accordance with one embodiment of the present invention. At step 700, a signal is received. At step 710, the signal is compressed at one or more compression rates. At step 720, the compressed signals are compared to the original signal to determine whether the compression resulted in an unacceptable loss of quality. At step 730, the highest compression rate which does not result in an unacceptable loss of quality is used to compress the signal, and the process repeats at step 700. Thus, the compression rate is continuously modified to insure compression is done at the optimal compression rate. Portions of the media signal which require a lower compression rate are compressed at a lower rate, and portions of the media signal which allow a higher compression rate are compressed at a higher rate.

Figure 8:
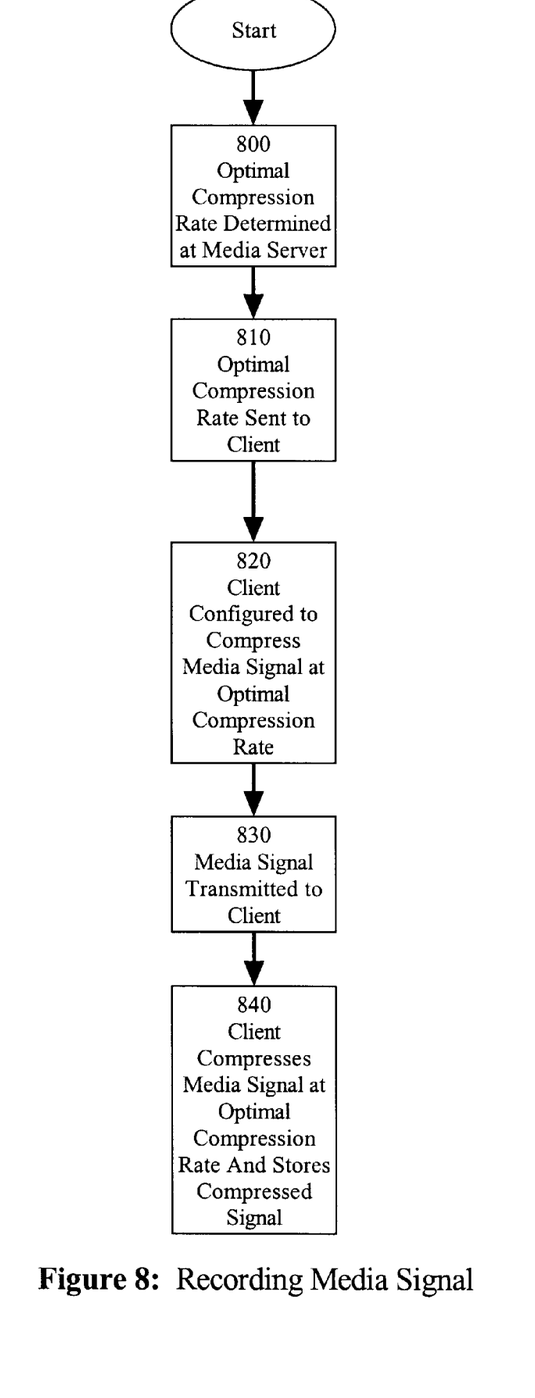
FIG. 8 is a flow diagram of the process of recording a media signal in accordance with one embodiment of the present invention.

In one embodiment, the information is generated at the server side of a client/server architecture. FIG. 8 illustrates the process of recording a media signal in accordance with one embodiment of the present invention. At step 800, an optimal compression rate is determined for the media signal at a media server. At step 810, the optimal compression rate is sent to a client. At step 820, the client is configured to compress the media signal at the optimal compression rate. At step 830, the media signal is transmitted to the client. At step 840, the client compresses the media signal at the optimal compression rate and stores the compressed signal.

Figure 9:
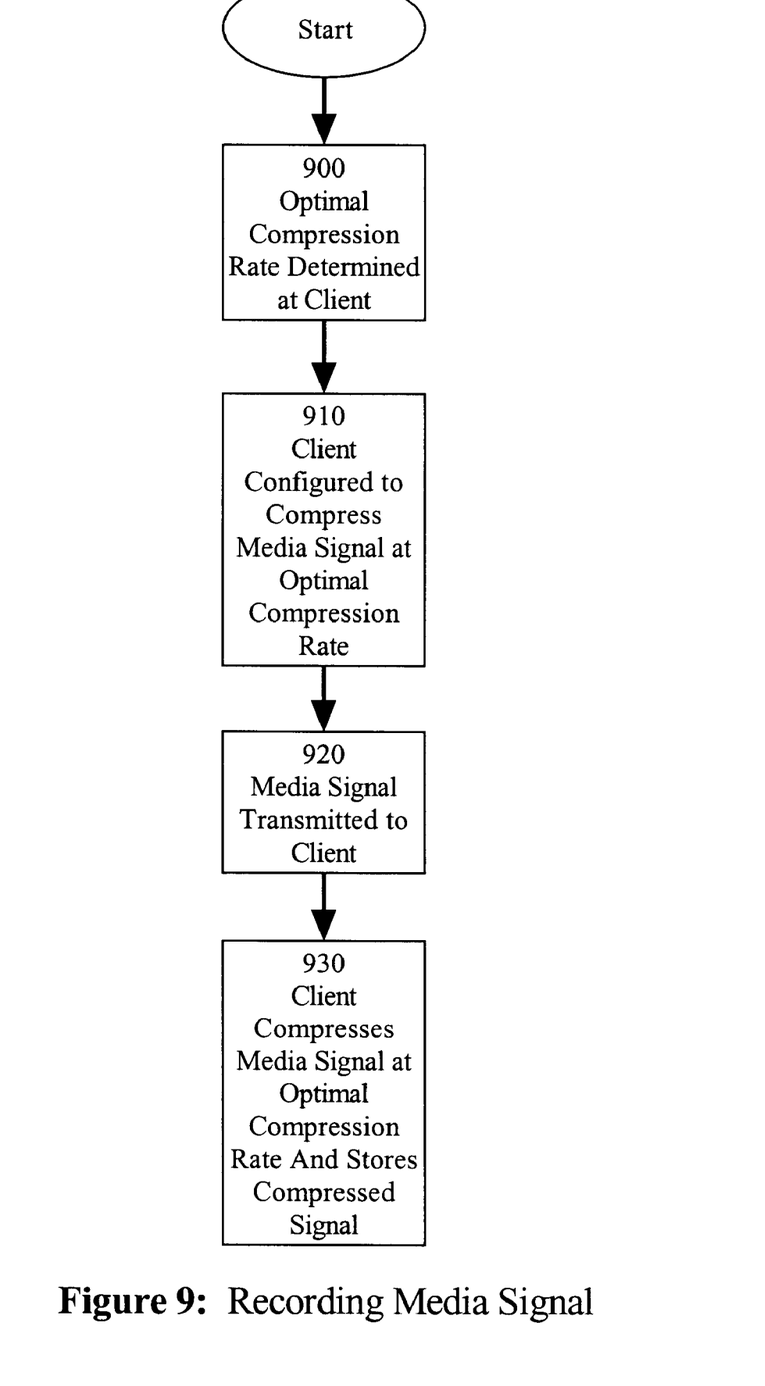
FIG. 9 is a flow diagram of the process of recording a media signal in accordance with one embodiment of the present invention.

In another embodiment, the information is generated at the client side of a client/server architecture. FIG. 9 illustrates the process of recording a media signal in accordance with one embodiment of the present invention. At step 900, an optimal compression rate is determined for the media signal at a client. At step 910, the client is configured to compress the media signal at the optimal compression rate. At step 920, the media signal is transmitted to the client. At step 930, the client compresses the media signal at the optimal compression rate and stores the compressed signal.

In yet another embodiment, the information is generated at both sides of a client/server architecture. In one embodiment, the information generated at a client is used by default. However, information generated at a server can override the information generated at a client. For example, the client may use meta-information in a program guide to select a high compression rate to record a media signal of a black and white movie. If an emergency broadcast which does not appear on the program guide interrupts the black and white movie, the high compression rate may be inappropriate. Thus, a new compression rate generated by the server can override the compression rate selected by the client.

Embodiment of Computer Execution Environment (Hardware)

Figure 10:
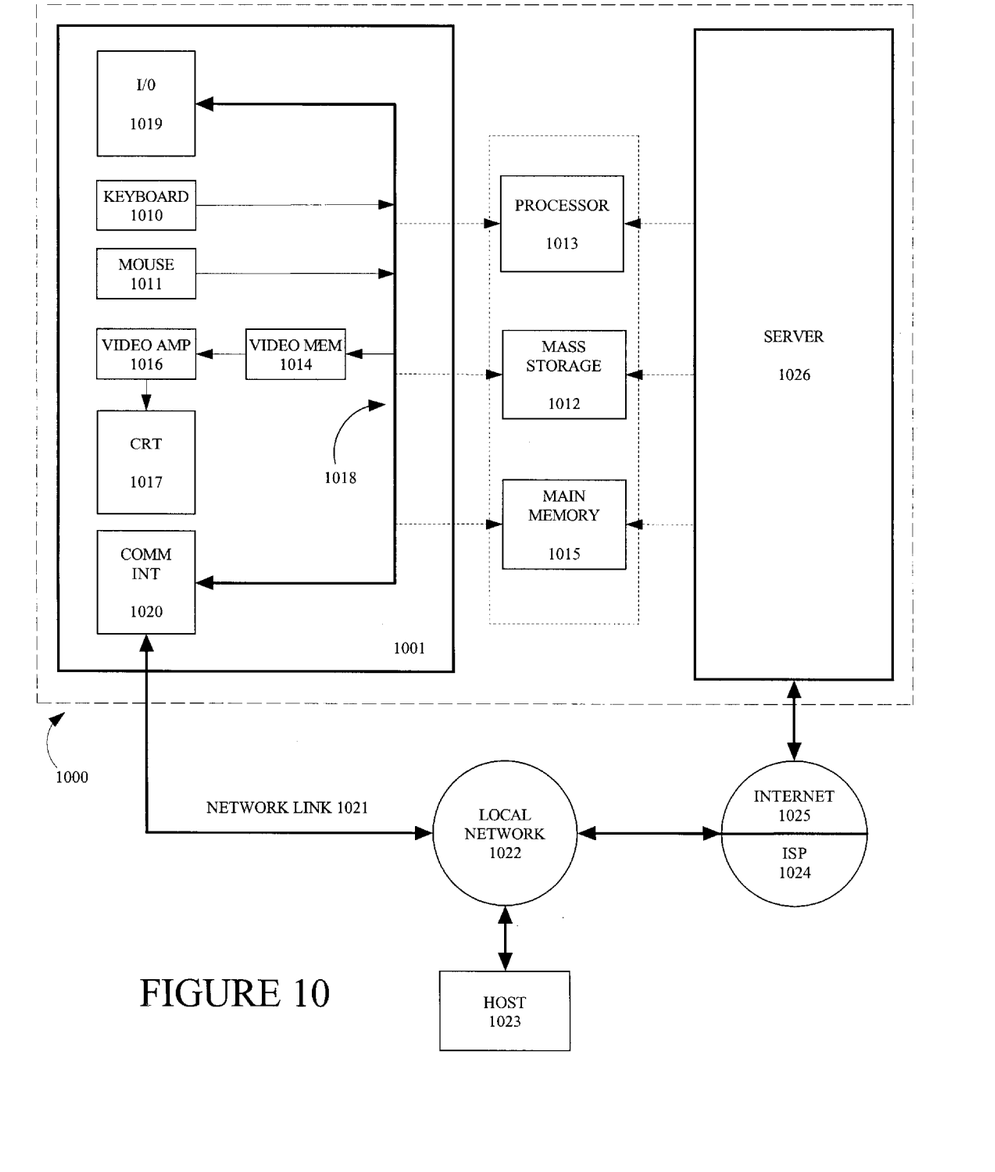
FIG. 10 is a block diagram of a general purpose computer.

One or more embodiments of the present invention makes recording and/or viewing devices using a general purpose computing device as shown in FIG. 10. A keyboard 1010 and mouse 1011 are coupled to a system bus 1018. The keyboard and mouse are for introducing user input to the computer system and communicating that user input to central processing unit (CPU) 1013. Other suitable input devices may be used in addition to, or in place of, the mouse 1011 and keyboard 1010. I/O (input/output) unit 1019 coupled to bi-directional system bus 1018 represents such I/O elements as a printer, A/V (audio/video) I/O, etc.

Computer 1001 may include a communication interface 1020 coupled to bus 1018. Communication interface 1020 provides a two-way data communication coupling via a network link 1021 to a local network 1022. For example, if communication interface 1020 is an integrated services digital network (ISDN) card or a modem, communication interface 1020 provides a data communication connection to the corresponding type of telephone line, which comprises part of network link 1021. If communication interface 1020 is a local area network (LAN) card, communication interface 1020 provides a data communication connection via network link 1021 to a compatible LAN. Wireless links are also possible. In any such implementation, communication interface 1020 sends and receives electrical, electromagnetic or optical signals which carry digital data streams representing various types of information.

Network link 1021 typically provides data communication through one or more networks to other data devices. For example, network link 1021 may provide a connection through local network 1022 to local server computer 1023 or to data equipment operated by ISP 1024. ISP 1024 in turn provides data communication services through the world wide packet data communication network now commonly referred to as the "Internet" 1025. Local network 1022 and Internet 1025 both use electrical, electromagnetic or optical signals which carry digital data streams. The signals through the various networks and the signals on network link 1021 and through communication interface 1020, which carry the digital data to and from computer 1000, are exemplary forms of carrier waves transporting the information.

Processor 1013 may reside wholly on client computer 1001 or wholly on server 1026 or processor 1013 may have its computational power distributed between computer 1001 and server 1026. Server 1026 symbolically is represented in FIG. 10 as one unit, but server 1026 can also be distributed between multiple "tiers". In one embodiment, server 1026 comprises a middle and back tier where application logic executes in the middle tier and persistent data is obtained in the back tier. In the case where processor 1013 resides wholly on server 1026, the results of the computations performed by processor 1013 are transmitted to computer 1001 via Internet 1025, Internet Service Provider (ISP) 1024, local network 1022 and communication interface 1020. In this way, computer 1001 is able to display the results of the computation to a user in the form of output.

Computer 1001 includes a video memory 1014, main memory 1015 and mass storage 1012, all coupled to bi-directional system bus 1018 along with keyboard 1010, mouse 1011 and processor 1013. As with processor 1013, in various computing environments, main memory 1015 and mass storage 1012, can reside wholly on server 1026 or computer 1001, or they may be distributed between the two. Examples of systems where processor 1013, main memory 1015, and mass storage 1012 are distributed between computer 1001 and server 1026 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 1012 may include both fixed and removable media, such as magnetic, optical or magnetic optical storage systems or any other available mass storage technology. Bus 1018 may contain, for example, thirty-two address lines for addressing video memory 1014 or main memory 1015. The system bus 1018 also includes, for example, a 32-bit data bus for transferring data between and among the components, such as processor 1013, main memory 1015, video memory 1014 and mass storage 1012. Alternatively, multiplex data/address lines may be used instead of separate data and address lines.

In one embodiment of the invention, the processor 1013 is a SPARC microprocessor from Sun Microsystems, Inc., a microprocessor manufactured by Motorola, such as the 680X0 processor, or a microprocessor manufactured by Intel, such as the 80X86 or Pentium processor. However, any other suitable microprocessor or microcomputer may be utilized. Main memory 1015 is comprised of dynamic random access memory (DRAM). Video memory 1014 is a dual-ported video random access memory. One port of the video memory 1014 is coupled to video amplifier 1016. The video amplifier 1016 is used to drive the cathode ray tube (CRT) raster monitor 1017. Video amplifier 1016 is well known in the art and may be implemented by any suitable apparatus. This circuitry converts pixel data stored in video memory 1014 to a raster signal suitable for use by monitor 1017. Monitor 1017 is a type of monitor suitable for displaying graphic images.

Computer 1001 can send messages and receive data, including program code, through the network(s), network link 1021, and communication interface 1020. In the Internet example, remote server computer 1026 might transmit a requested code for an application program through Internet 1025, ISP 1024, local network 1022 and communication interface 1020. The received code may be executed by processor 1013 as it is received, and/or stored in mass storage 1012, or other non-volatile storage for later execution. In this manner, computer 1000 may obtain application code in the form of a carrier wave. Alternatively, remote server computer 1026 may execute applications using processor 1013, and utilize mass storage 1012, and/or video memory 1015. The results of the execution at server 1026 are then transmitted through Internet 1025, ISP 1024, local network 1022 and communication interface 1020. In this example, computer 1001 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

One or more embodiments of the present invention have been described in connection with a device which records media or views media. It is understood by one skilled in the art that any media viewer or media recorder can be used with the present invention. Typical media viewers and/or media recorders include VCRs, digital video disk players, digital video disk recorders and the newly emerging set top boxes.

One type of set top box system that can be used with the present invention is described in co-pending U.S. patent application entitled "Multi-Node Entertainment System Architecture" application Ser. No. 09/657,317, filed on Sep. 7, 2000, assigned to the assignee of the present application, and hereby fully incorporated into the present application by reference.

Thus, a method and apparatus for compression rate selection is described in conjunction with one or more specific embodiments. The invention is defined by the following claims and their full scope and equivalents.

What is claimed is:

1. A method for recording a media signal comprising:
   generating one or more data items wherein said data items are associated with said media signal;
   determining a maximum compression rate from said data items wherein recording said media signal compressed at said maximum compression rate does not result in an unacceptable loss of quality of said media signal;
   compressing said media signal at said maximum rate into a compressed media signal; and
   storing said compressed media signal, wherein said step of determining is performed at a client in a client/server architecture.

2. A method for recording a media signal comprising:
   generating one or more data items wherein said data items are associated with said media signal;
   determining a maximum compression rate from said data items wherein recording said media signal compressed at said maximum compression rate does not result in an unacceptable loss of quality of said media signal;
   compressing said media signal at said maximum rate into a compressed media signal; and
   storing said compressed media signal, wherein said step of determining is performed at a server in a client/server architecture.

3. The method of claim 2 wherein said maximum compression rate is used instead of a first compression rate wherein said first compression rate is determined at a client in said client/server architecture.

4. A recorder comprising:
   a generator configured to generate one or more data items wherein said data items are associated with a media signal;
   a determiner configured to determine a maximum compression rate from said data items wherein recording said media signal compressed at said maximum compression rate does not result in an unacceptable loss of quality of said media signal;
   a signal compressor configured to compress said media signal at said maximum rate into a compressed media signal; and
   a storage unit configured to store said compressed media signal, wherein said determiner is part of a client in a client/server architecture.

5. A recorder comprising:
   a generator configured to generate one or more data items wherein said data items are associated with a media signal;
   a determiner configured to determine a maximum compression rate from said data items wherein recording said media signal compressed at said maximum compression rate does not result in an unacceptable loss of quality of said media signal;
   a signal compressor configured to compress said media signal at said maximum rate into a compressed media signal; and
   a storage unit configured to store said compressed media signal, wherein said determiner is part of a server in a client/server architecture.

6. The recorder of claim 5 wherein said maximum compression rate is used instead of a first compression rate wherein said first compression rate is determined at a client in said client/server architecture.

7. A computer program product comprising:
   a computer usable medium having computer readable program code embodied therein configured for recording a media signal, comprising:
      computer readable code configured to cause a computer to generate one or more data items wherein said data items are associated with said media signal;
      computer readable code configured to cause a computer to determine a maximum compression rate from said data items wherein recording said media signal compressed at said maximum compression rate does not result in an unacceptable loss of quality of said media signal;
      computer readable code configured to cause a computer to compress said media signal at said maximum rate into a compressed media signal; and
      computer readable code configured to cause a computer to store said compressed media signal, wherein said computer readable code configured to cause a computer to generate comprises:
         computer readable code configured to cause a computer to compress said media signal at a first compression rate; and
         computer readable code configured to cause a computer to determine whether said first compression rate results in said unacceptable loss.

8. A computer program product comprising:
   a computer usable medium having computer readable program code embodied therein configured for recording a media signal, comprising:
      computer readable code configured to cause a computer to generate one or more data items wherein said data items are associated with said media signal;
      computer readable code configured to cause a computer to determine a maximum compression rate from said data items wherein recording said media signal compressed at said maximum compression rate does not result in an unacceptable loss of quality of said media signal;

computer readable code configured to cause a computer to compress said media signal at said maximum rate into a compressed media signal; and computer readable code configured to cause a computer to store said compressed media signal, wherein said computer readable code configured to cause a computer to determine is part of a client in a client/server architecture.

9. A computer program product comprising:

a computer usable medium having computer readable program code embodied therein configured for recording a media signal, comprising:

computer readable code configured to cause a computer to generate one or more data items wherein said data items are associated with said media signal;

computer readable code configured to cause a computer to determine a maximum compression rate from said data items wherein recording said media signal compressed at said maximum compression rate does not result in an unacceptable loss of quality of said media signal;

computer readable code configured to cause a computer to compress said media signal at said maximum rate into a compressed media signal; and computer readable code configured to cause a computer to store said compressed media signal, wherein said computer readable code configured to cause a computer to determine is part of a server in a client/server architecture.

10. The computer program product of claim 9 wherein said computer readable code configured to cause a computer to determine comprises:

computer readable code configured to cause a computer to use a maximum compression rate instead of a first compression rate wherein said first compression rate is determined at a client in said client/server architecture.

* * * * *